May 1, 1934.  L. S. PARKER  1,956,622
REFRIGERATION APPARATUS
Original Filed Oct. 22, 1930   10 Sheets-Sheet 3

Fig. 6.

INVENTOR
Levin S. Parker
BY
Schechter & Lotsh
his ATTORNEYS

May 1, 1934.　　　　　L. S. PARKER　　　　　1,956,622
REFRIGERATION APPARATUS
Original Filed Oct. 22, 1930　　　10 Sheets-Sheet 4

May 1, 1934.   L. S. PARKER   1,956,622
REFRIGERATION APPARATUS
Original Filed Oct. 22, 1930   10 Sheets-Sheet 5

INVENTOR
Levin S. Parker
BY
Schechter Lotsch
his ATTORNEYS

May 1, 1934.　　　L. S. PARKER　　　1,956,622
REFRIGERATION APPARATUS
Original Filed Oct. 22, 1930　　10 Sheets-Sheet 6

INVENTOR
Levin S. Parker
BY
Schechter Lotsch
his ATTORNEYS

May 1, 1934.   L. S. PARKER   1,956,622
REFRIGERATION APPARATUS
Original Filed Oct. 22, 1930   10 Sheets-Sheet 8

INVENTOR
Levins Parker
BY
his ATTORNEYS

May 1, 1934.　　　　L. S. PARKER　　　　1,956,622
REFRIGERATION APPARATUS
Original Filed Oct. 22, 1930　　10 Sheets-Sheet 10

Levin S. Parker INVENTOR
BY Schedith Loketh
his ATTORNEYS

Patented May 1, 1934

1,956,622

UNITED STATES PATENT OFFICE 1,956,622

REFRIGERATION APPARATUS

Levin S. Parker, Brooklyn, N. Y.

Application October 22, 1930, Serial No. 490,412
Renewed October 26, 1933

9 Claims. (Cl. 62—95)

This invention relates to refrigeration apparatus of the type utilizing mechanical cooling units of the gas or electrically operated type.

An object of the present invention is to provide a refrigeration apparatus designed for the congelation of material as in the manufacture of ice cream, which is simple, efficient, durable, and particularly designed to meet the demands of economic manufacture.

Another objects is to provide a freezer which by virtue of the use of mechanical cooling means will operate to form ice cream without requiring ice or salt, thus materially reducing the cost of ice cream manufacture. The use of mechanical cooling means also operates to provide readily controllable uniform temperatures which insures dependable result, and wastage due to spoiled batches is thus avoided.

Another object is to provide a freezing apparatus designed and constructed so as to provide compactness of parts by which minimum floor space is required for maximum capacity of the apparatus.

Another object is to provide an apparatus of the type set forth in which the combination and arrangement of parts insures sanitation and facility in the operation thereof, and which is so constructed as to make advantageous use of the cooling medium to insure economical operation.

Another object, in compass with the last named, aiming at sanitation and facility of operation, is to provide auxiliary means whereby the transfer of the manufactured ice cream from the agitators or freezing cans to the storage compartments which ordinarily includes the process of removing the dashing or stirring blades from the frozen mass and stripping the adherent particles of ice cream therefrom by manual means, is performed without unduly exposing the contents to the free atmosphere for any length of time, preventing the incidental entrance of foreign matter or dust to the ice cream, while the scraping and cleaning of the dasher or the blades is partly accomplished automatically and in less time than by separate manual tools.

Another object is to provide a freezer assembly embodying a rotatable freezer, a motor for driving the same, and a driving interconnection, the assembly by combination and inter-relation of parts, as well as by individual characteristics of the elements, constituting a simple, highly efficient and dependable arrangement which is rugged to withstand hard usage and abuse, and which is easily operated by unskilled persons.

Another object of the invention is to provide an apparatus embodying the foregoing desiderata in a single unitary self-contained structure, the details of construction and inter-relation of parts of which insure economy in manufacture and operation, and sanitation and simplicity in ice cream manufacture therewith.

Many other objects too numerous to mention concerned with the details of the construction will be apparent as the following detailed description of the apparatus is considered.

The invention as a whole and various features thereof will be understood to be subject to widely differing modifications. A preferred embodiment thereof as illustrated in the drawings consists of a specially constructed brine tank, coiled adjacent the walls of which are the circulation pipes of a mechanical cooling unit. Mounted for rotation within the cooled brine, there is located a congelation chamber, driving connection therefor being preferably maintained by a receiving collar locked thereto. A driving motor is mounted in a recess of the cabinet so as to conserve space and a driving belt, or the equivalent, with which is associated a belt tightener of improved design, extends from motor to chamber to effect drive of the chamber. Among numerous important features of the invention hereinafter to be discussed in detail is the provision of a chamber cover arranged to permit withdrawal of an agitator from the chamber without any waste of the ice cream therefrom, the cover acting as a stripper for the agitator. It will be noted that in most instances the agitator or paddles will remain stationary while the chamber moves, such movement acting to circulate the brine to insure uniform temperature throughout. Another important element is the provision of brick freezing pans, the chambers for which are surrounded with the cooling pipes and are easily accessible from the exterior of the cabinet.

Other preferred structural modifications of the apparatus include milk cooling compartments and means for either holding the dasher, rotating it, or rotating paddles carried by the dasher proper. The inventor also contemplates numerous freezer can revolving means such as revolving tables in the brine tank on which the freezer rests, and also various modifications of the can drive such as direct gear drives and silent chain drives. All of the modifications are interchangeable and jointly contemplate numerous combina- Further understanding of the invention may be had from a consideration of the following detailed specification in connection with the accompanying drawings, in which:

In considering the drawings and following specification, it will be understood that the various features shown in the modifications are all interchangeable, the specific combination of elements of any one modification being subject to recombination to include different structural arrangements.

One preferred structure of the invention is shown in general and in detail in Figs. 1 to 16 of the drawings. The cabinet as shown in Figs. 1, 2, 6 and 7 is formed of an inner metal brine tank 10 open at its top. The bottom, sides and top are insulated with suitable insulating material here illustrated in the form of cork at 11. Over the cork 11 are built laminated wood sides 12 which give the necessary rigidity to the assembly. The whole cabinet may then be encased in a metal frame 13, thus providing an easily cleaned attractive sanitary outer surface. The top is provided with holes cut through the insulation and the laminated wood to receive the freezing apparatus cans and other requisite implements. The metal cover 13a of the top is formed of bright non-corrosive metal which may be easily cleaned and which will give a desirable spick and span appearance to the apparatus. Upon the top, an instrument panel and control board 15 is mounted by which operating conditions may be observed and controlled.

Figure 1:
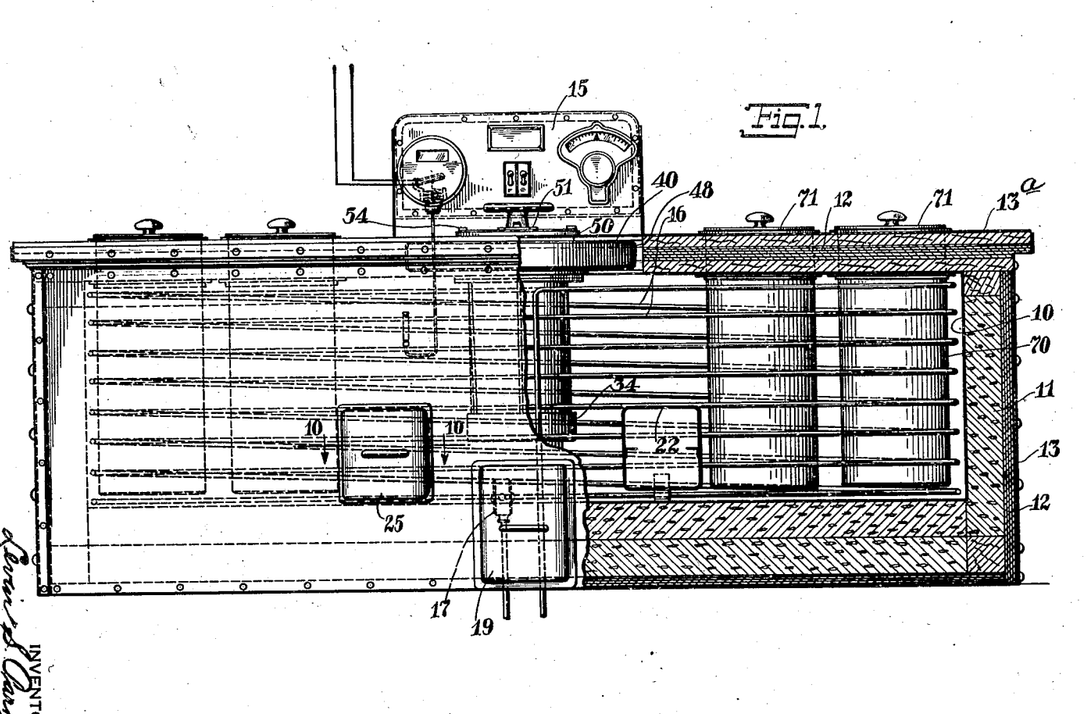
Fig. 1 is a longitudinal elevation of one commercially successful embodiment of the invention with a portion thereof shown in section.
Figures 2, 3, 4, 5:
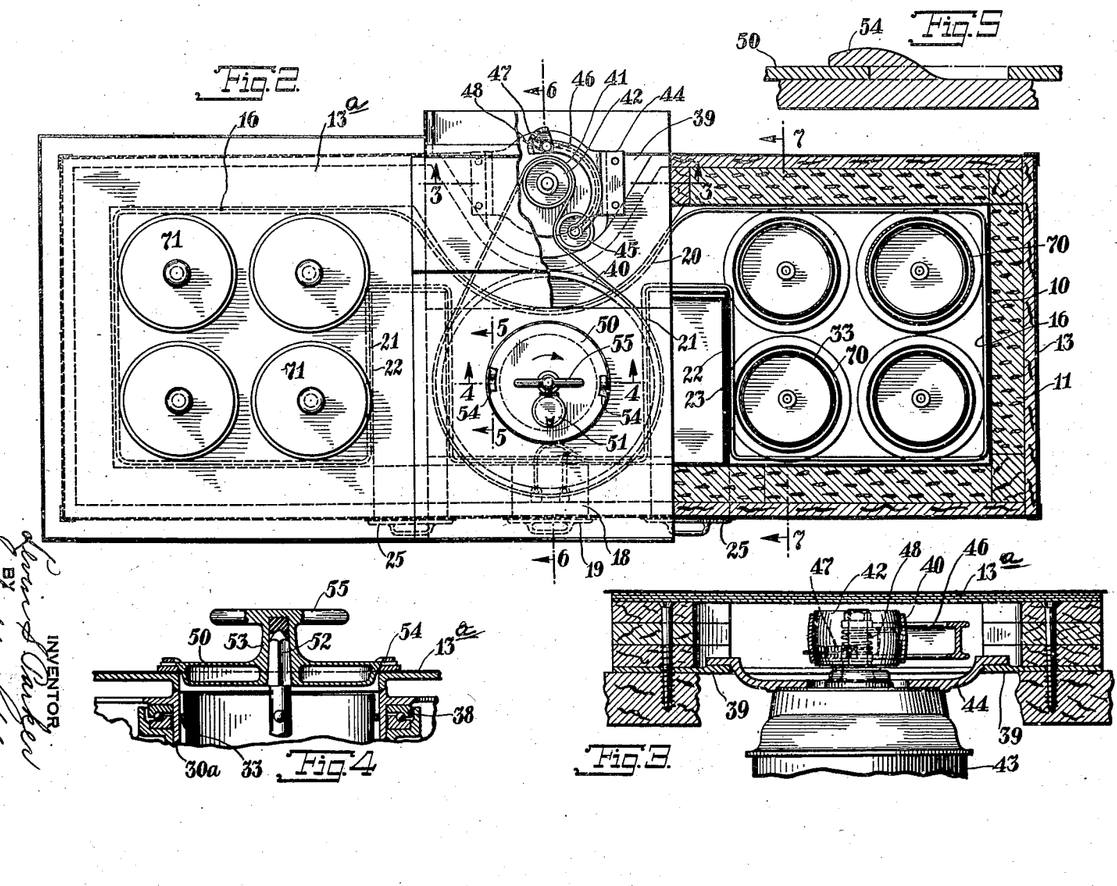
Fig. 2 is a top plan view partly in section.
Fig. 3 is a section taken on lines 3—3 of Fig. 2.
Fig. 4 is a section taken on lines 4—4 of Fig. 2.
Fig. 5 is a detail section taken on lines 5—5 of Fig. 2.
Figure 6:
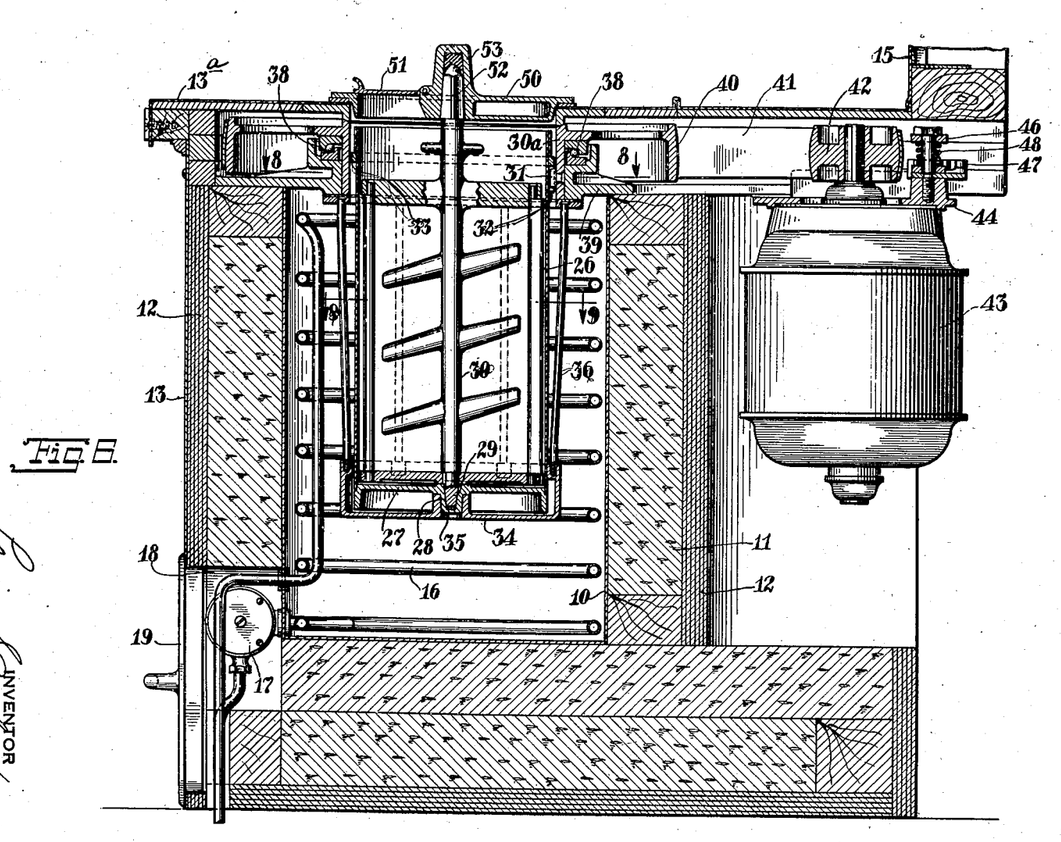
Fig. 6 is a section taken on lines 6—6 of Fig. 2.

While the outer configuration of the cabinet is generally rectangular, reference to Figs. 2 and 6 shows a depression in the back which receives a motor suitably mounted as will be hereinafter described. The inner configuration of the brine tank follows the outline of the outer surface, and thus is of reduced width at its center.

Figure 12:
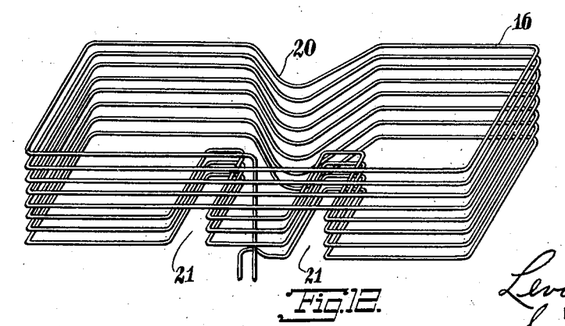
Fig. 12 is a detail perspective view of the cooling coil.
Figure 13:
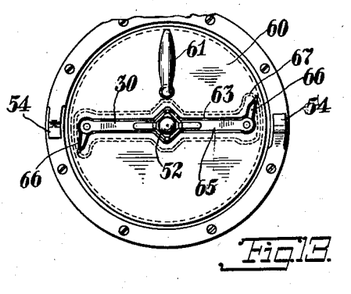
Fig. 13 is a top plan view of the freezing can with stripper cover thereon.

The brine tank is adapted to be substantially filled with brine (not shown). The brine cooling is effected by expansion pipes 16 of a mechanical cooling unit, the expansion and control valve of which is shown at 17, it being received within a recess 18 of the cabinet wall, a removable cover 19 permitting ready access thereto. As shown in Fig. 12, the cooling pipes are arranged to extend around the side walls, closely thereto, of the cabinet, and thus form a shell following the contour of the brine tank walls. Thus a depression 20 at the back of the coil conforms with the depression formed by the motor mounting niche. The front of the coil is provided with one or more (here shown as two) depressions or pockets 21 which are closely adjacent inwardly extending pockets 22 as shown in detail in Figs. 10 and 11. The pockets 22 may be positioned in any convenient manner in the walls of the cabinet and are adapted to receive slidable carrying pans 23 on which are positioned individual removable brick forming moulds 24. The pockets are closed by heat insulated doors 25 and thus the apparatus provides for the making of brick ice cream as well as of bulk ice cream.

Figure 14:
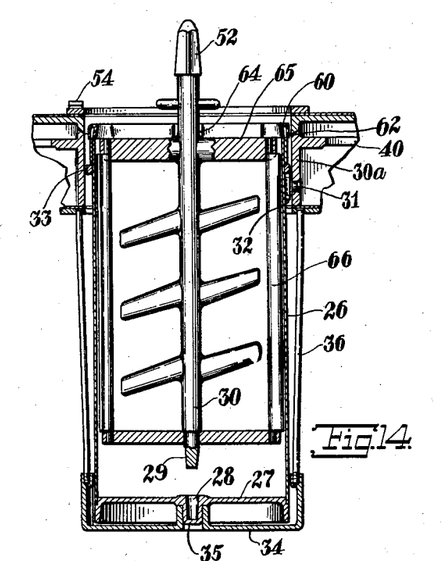
Fig. 14 is a vertical section of the freezing can with stripper cover thereon.
Figure 15:
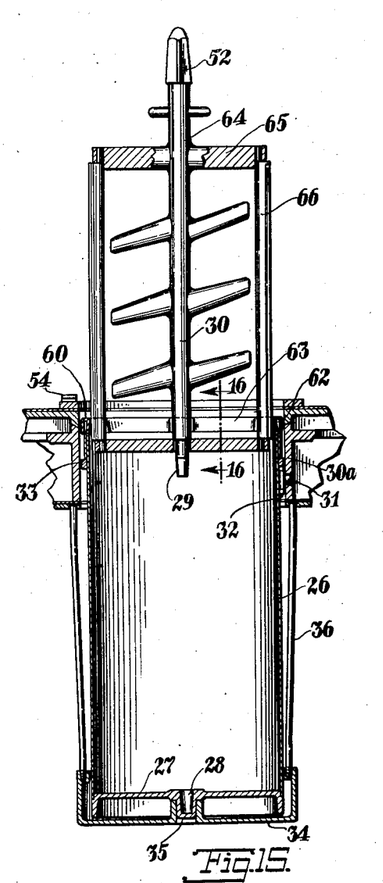
Fig. 15 is a view similar to Fig. 14 showing the agitator being removed.
Figure 16:
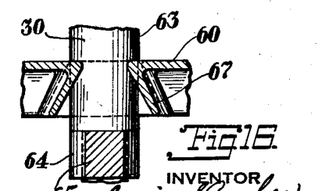
Fig. 16 is a detail section taken on lines 16—16 of Fig. 15.

The cans in which the ice cream is made and packed are indicated by the numeral 26, the preferred can and mounting structure being best illustrated in Figs. 6, 14 and 15. The thin metal side walls of the cans fit over and are secured to a relatively heavy concave bottom 27 which has a closed bearing recess 28 at its center into which a bearing spindle 29 of a dasher 30 may be mounted, the bearing being such as to permit substantially frictionless movement between the can and dasher.

For rotating the can to agitate the mixing during the freezing operation, one or more apertures for cans, and preferably the center can aperture is provided with a can engaging ring 30a, the inner face of which is furnished with a projection or stud 31 which engages a cooperating stud 32 on the can and over which a can rim 33 rides; the arrangement providing an effective can drive through rotation of the ring 30a and also forming an efficient snug embrace for the can to prevent accidental movement or vibration thereof. The bottom of the can is seated within a stirrup 34, the center of which is apertured to provide a bearing support which receives the bearing stud 35 of the can bottom. The stirrup is supported from a skeleton or spider support constituted by the tie rods 36, this arrangement providing a free support for the can whereby in freezing it will be contacted directly with the brine and whereby its rotation will cause a proper circulation of the brine as set forth in my copending application, Serial No. 382,776, filed August 1, 1929.

The ring 30a is supported through a ball bearing race 38 upon a rigid metal frame 39 surrounding the can hole. Above the race 38, the ring extends outwardly and is provided with a wide periperal flange 40 constituting a belt pulley. A belt 41 passes therearound and extends rearwardly, under the upper cabinet surface, to pass over a pulley 42 of a motor (preferably electric) 43. As shown in Fig. 3, the motor 43 is supported by its motor plate 44 which extends between and laps over rearwardly extending furcations of the plate 39. This form of assembly provides for a convenient removability of the motor and disposes the motor within the bounding planes of the cabinet. Associated with the motor base a belt tightener is provided, the best disclosure of which will be found in Fig. 28. The tightener comprises a pulley wheel 45 carried by the extremity of an arcuately shaped tensioning arm 46, the opposite end of which is pivotally mounted behind the motor pulley 42, and it includes a notched end within the notches of which a spring urged detent 47 extends to maintain the wheel in adjusted position. The detent is movable upwardly out of the notches against the tension of its spring 48 to release the arm whereby it may be pivotally moved to vary the tension applied on the belt 41.

During the freezing operation, the can aperture is closed by a closure lid 50 which has a flap 51 which may be opened to inspect the mix and to observe the operations of the dasher. The upper end 52 of the dasher is squared and is received with a complementary squared socket 53 of the cover. The dasher is thus preferably held stationary while the can is revolved. The respective movement thus provides adequate agitation of the mix during its freezing. The cover 50 is locked in sealing fit by lugs 54, shown in Fig. 5, which are received through apertures in the cover edge. Rotation of the cover by manipulation of its handle 55 will thus engage the edges under the lugs 54 to firmly secure the cover in position.

After the churning and freezing operation is completed, the dasher is removed to prevent waste of material due to portions thereof clinging thereto, and to prevent the entrance of foreign matter to the ice cream a stripper cover 60 shown in Figs. 13 to 16 is provided. After the cover 50 is removed, the stripper 60 is applied by use of its convenient handle 61. The edge of the stripper fits over the lip of the can as shown at 62 in Figs. 14 and 15. The stripper has a long aperture 63 there-across designed to conform with the cross section of the dasher center shaft 64, cross arms 65 and side scrapers 66. With the stripper in place, the dasher may be turned to register with the stripper aperture and may then be withdrawn by vertical lift, the flanged edges 67 of the aperture 63 scraping or stripping particles of ice cream therefrom and preventing waste of material.

Figure 7:
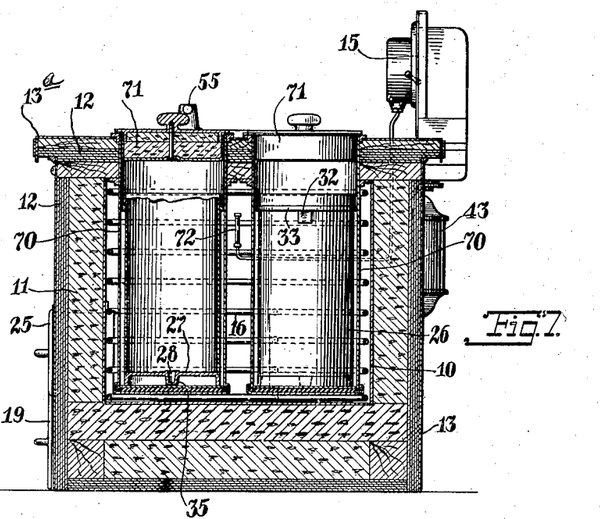
Fig. 7 is a section taken on lines 7—7 of Fig. 2.
Figure 8:
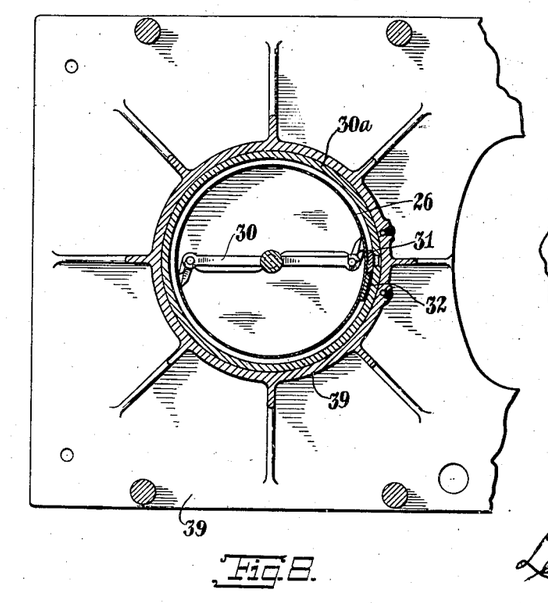
Fig. 8 is a horizontal section taken on lines 8—8 of Fig. 6.
Figure 9:
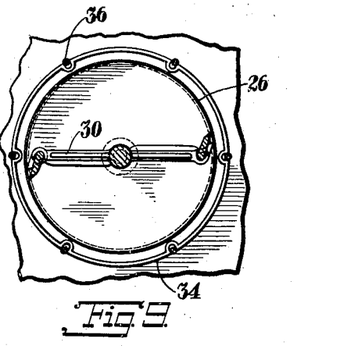
Fig. 9 is a horizontal section taken on lines 9—9 of Fig. 6.
Figure 10:
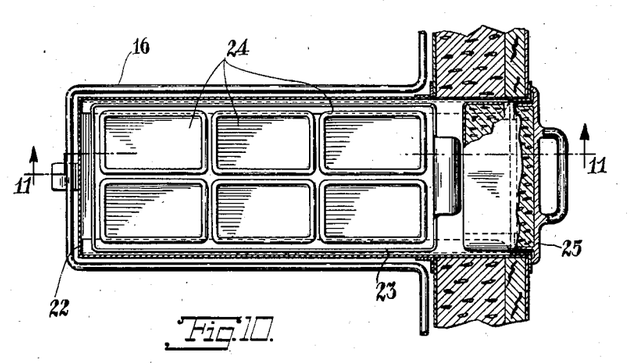
Fig. 10 is a sectional view taken on lines 10—10 of Fig. 1.
Figure 11:
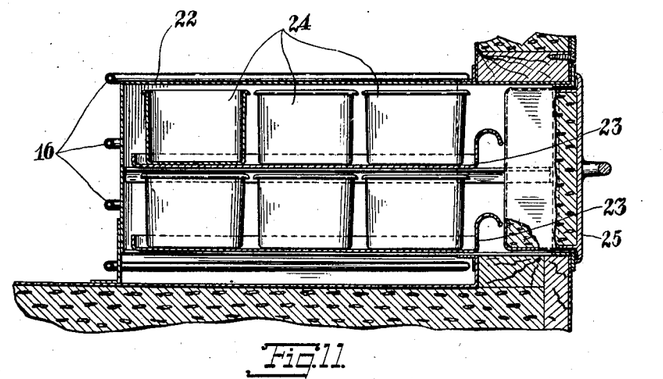
Fig. 11 is a sectional view taken on lines 11—11 of Fig. 10.

After freezing and removal of the dasher the cans of ice cream are removed from their support in the stirrup and in contact with the brine, and are placed in packing cylinders 70 which are fitted through the top of the cabinet as shown in Fig. 7. The cylinders 70 are closed by suitable insulating covers 71. The ice cream may thus be held for dispensing from the cans or for subsequent removal and shipment. It will be noted that while in the cylinders 70 the cans are not in direct contact with the brine as in the case of freezing. Thus they are at a slightly higher temperature so that the ice cream is in the desired state of congelation for serving. In Fig. 7 is also illustrated a thermostat bulb 72 which leads to the instrument board to indicate at all times the temperature of the brine.

Figure 17:
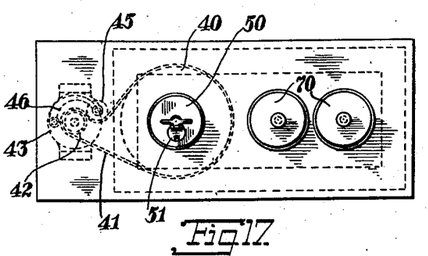
Fig. 17 is a plan view of a modified cabinet arrangement.

In view of the foregoing elaborate description of the apparatus, it is believed unnecessary to discuss in detail the operation of the preferred form of the invention, the normal operations of such apparatus being in general followed except for such features as dasher stripping, can revolving, belt tightener, etc. While the preferred embodiment of the cabinet discloses a central freezing structure and four packing cylinders on either side thereof, a modified form of the invention as shown in Fig. 17 may be provided in which the freezing structure is at one end of the cabinet and two packing cylinders in direct line therewith are used. As this structure preferably uses the structural details enumerated hereinbefore, detail references thereto need not be here entered into.

Figure 18:
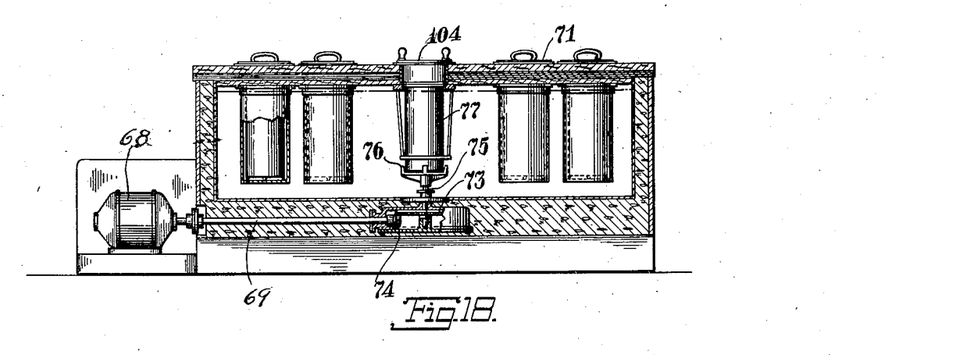
Fig. 18 is a vertical section of an apparatus embodying a modification of the freezer drive.

A further modification of the invention is shown in Fig. 18. In this form of the invention, a motor 68 is mounted at the base level of the cabinet and at one end thereof. The motor drives a longitudinally extending drive shaft 69 encased in the thick heat insulating bottom and at the center a rim gear 73 is mounted meshing with a bevel gear 74 carried by the inner end of the shaft 69. The rim gear 73 rotates a vertical central shaft 75 which carries at its upper end a can supporting table 76. In operation of the motor, the shafts 69 and 75 are revolved and the freezer can 77 mounted on the table 76 is revolved to agitate the mix as in the form of the invention hereinbefore described. It will be understood that suitable interlocking means between table and can may be employed to insure proper drive therebetween. An important feature of this form of the invention is that it provides a solid ground support for the motor, thus permitting the use of a heavy vibrating motor and relieves vibrating strains from the cabinet. If desired this form of the invention may employ an internal combustion engine, the vibrations of which would render it unsuitable for mounting on the cabinet.

Figure 19:
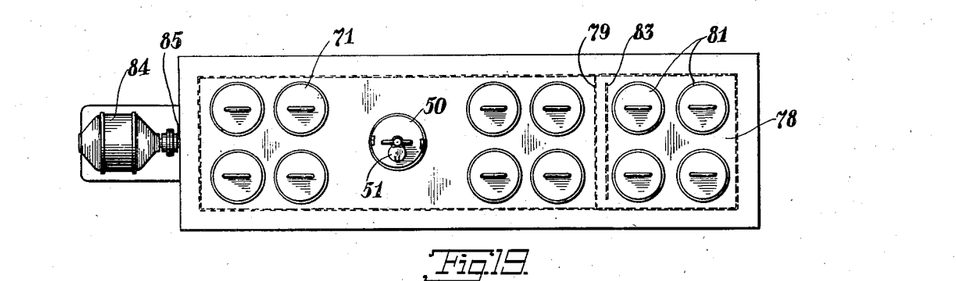
Fig. 19 is a plan view of a cabinet including a plurality of cooling chambers of different temperatures.
Figures 20, 21:
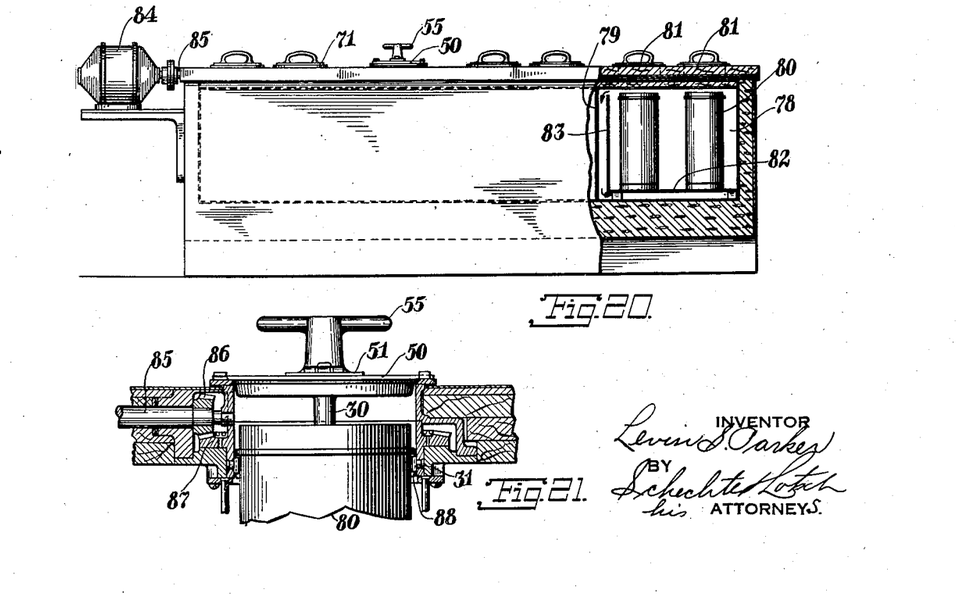
Fig. 20 is a side elevation partly broken away of the apparatus shown in Fig. 19.
Fig. 21 is a detail view illustrating a modification using a bevel gear drive.
Figure 22:
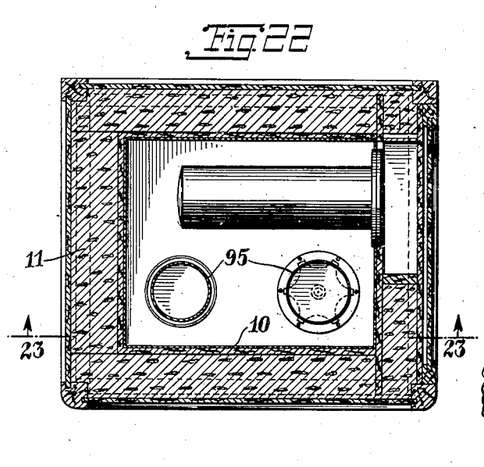
Fig. 22 is a horizontal section of a modified cabinet arrangement as taken on lines 22—22 of Fig. 23.
Figure 23:
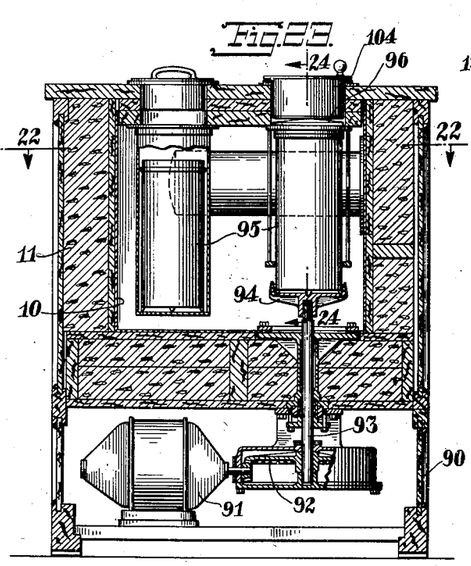
Fig. 23 is a section taken on lines 23—23 of Fig. 22.

In the form of the invention shown in Figs. 19 and 20, the cabinet is provided at one end with a milk cooling compartment 78. This compartment does not receive the brine from the freezing compartment but is divided therefrom by a heat transferring partition 79. The milk cans 80 may thus be positioned in the compartment 78, the temperature of which will be amply low enough to preserve the milk and will not be sufficiently low to freeze it. This compartment is formed by the walls, bottom and cover of the main body of the apparatus and the top is apertured for admission of the cans 80, covers 81 being provided for the apertures. The cans rest upon a perforated platform 82 to the inner edge of which is secured a baffle-plate 83. This arrangement provides a free circulation of air over and under the cans and next to the wall 79 so that constantly cool circulation of air is maintained.

As illustrating a further modification of the can driving arrangement, the cabinets of Figs. 19 and 20 have a motor 84 supported with its drive shaft in line with and extending longitudinally into the top. The drive for freezing can is shown in detail in Fig. 21. The motor drive shaft 85 terminates in a bevel gear 86, which meshes with a rim gear 87. The rim gear is the equivalent of the previously described ring 30a and locks to the can to rotate it as by the lugs 88.

This form of the invention provides a positive drive for the can which in some instances may be preferable over the belt drive previously described. The dasher retention and cover and cover lock, etc. are preferable as hereinbefore discussed or are their equivalent.

Figs. 22 to 27 of the drawings illustrate a form of the invention utilizing a centralized cooling unit as shown in my copending application and as distinct from the cooling coil before referred to. The brine tank of this form of the invention and the insulating housing cabinet thereof is supported on a base structure 90 which raises it from the floor. Within the base 90 a motor 91 is provided which drives through a rim gear 92 and vertical shaft 93, a freezer can table 94 as shown in Fig. 18. The whole structure thus takes up only a minimum of purely rectangular floor space and provides a solid floor mounting for the motor, the top of the cabinet being relieved from the support of the motor and no recess in the brine tank itself for accommodating the motor is required.

Figure 24:
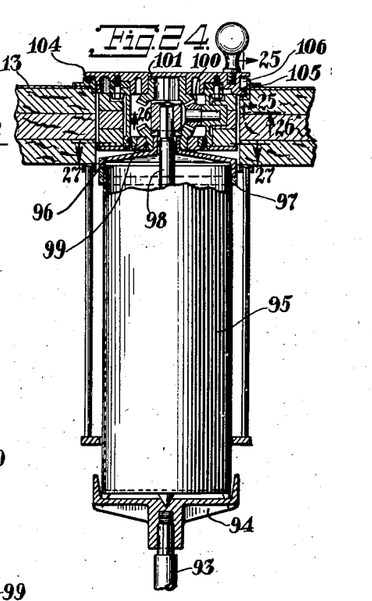
Fig. 24 is a detail section taken on lines 24—24 of Fig. 23.
Figure 25:
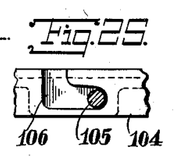
Fig. 25 is a detail section taken on lines 25—25 of Fig. 24.
Figure 26:
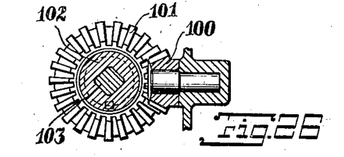
Fig. 26 is a detail section taken on lines 26—26 of Fig. 24.
Figure 27:
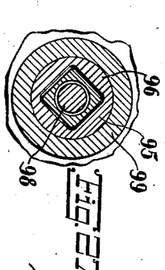
Fig. 27 is a detail section taken on lines 27—27 of Fig. 24.

In conjunction with this form of the invention there is also illustrated a modification of the dasher drive. In place of merely holding the dasher while driving the can, the dasher is rotated by rotation of the can and in opposite direction thereto so as to increase the mixing and agitating operation. As shown in Fig. 24, the can 95 is provided with a cover 96, a slotted portion at 97 acting to hold the cover for rotation with the can. The cover 96 has a central aperture to receive the dasher shaft 98 therethrough and around the aperture. A gear 99 is provided which meshes with an idling intermediate bevel gear 100, the opposite side of which drives a bevel gear 101, the center of which has a squared hole receiving therein a dasher driving bushing 102 which in turn receives and drives the squared head 103 of the dasher. The cover 104 mounts both the intermediate gear 100 and the gear 101 and is adapted to be locked in place by the pin 105 and groove 106 which form a bayonet joint as shown in Fig. 25. This form of the dasher assembly will be seen to provide maximum agitation by a simple effective and efficient use of the can rotation and avoids the necessity of direct motor drive for the dasher.

Figure 28:
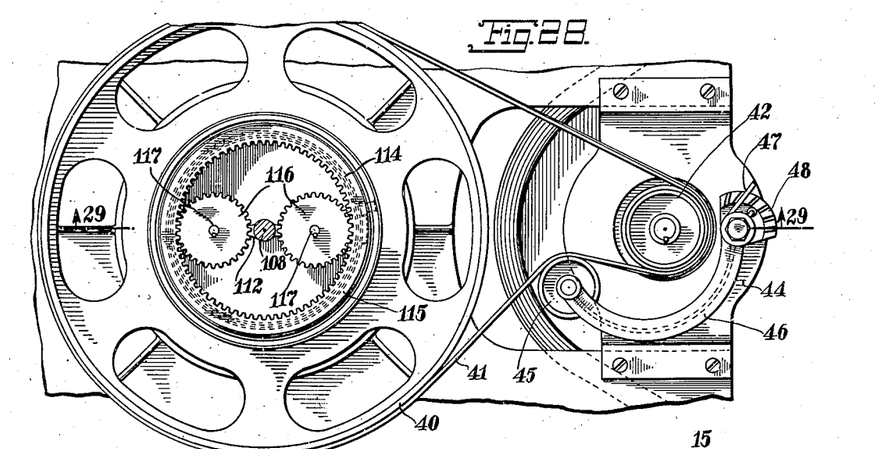
Fig. 28 is a top plan view of a freezer can drive assembly utilizing paddle driving means.
Figures 29, 30:
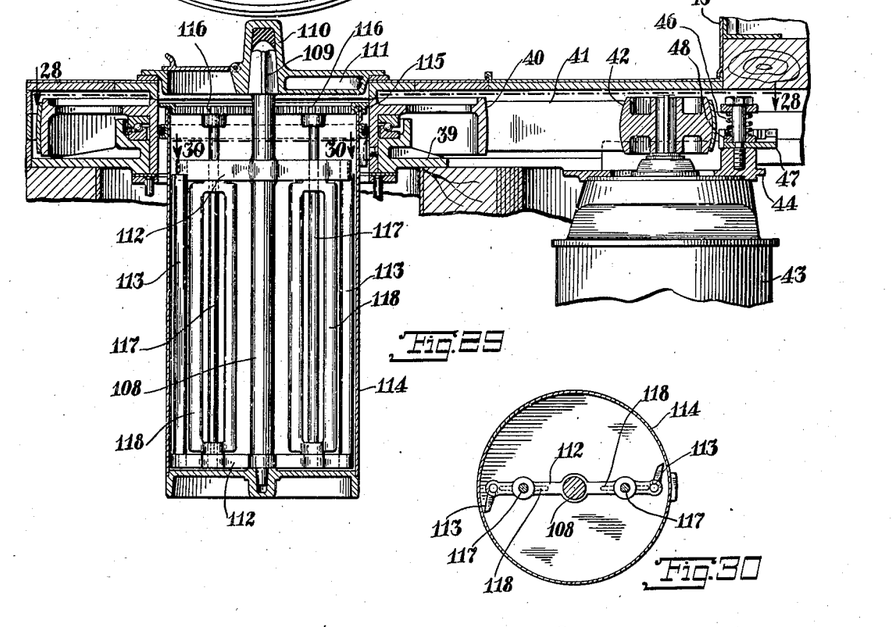
Fig. 29 is a vertical section taken on lines 29—29 of Fig. 28.
Fig. 30 is a detail section taken on lines 30—30 of Fig. 29.

Figs. 28 to 30, in addition to showing the detail construction of the belt tightener, show in conjunction therewith a further modification of the dasher and driving means therefor. In this case the dasher shaft 108 is retained against rotation by the reception of its squared end 109 in a squared socket 110 of the cover 111. The dasher arms 112 are also held by rigid connection with the shaft 108 and the side scraper blades 113 are also supported by the arms 112 against any movement. The can is revolved in any desired manner as by any of the structures hereinbefore described, the instant case utilizing the belt drive. The lip of the freezing can 114 carries an internally toothed gear ring 115, the teeth of which mesh with small gears 116 mounted on upstanding ends of paddle bars 117 which are journaled in the dasher arms 112. Between the arms 112, the bars 117 are provided with paddles 118, which by securement or integral formation with the bars 117, rotate therewith to vigorously churn the mix during its agitation. It will be seen that this dasher drive also provides for the dasher movement in response to can rotation and is applicable with other modifications of the can drive. The vigorous agitation of the mix as provided for by the swiftly revolving paddles insure a creamy light ice cream which is greatly desired by many ice cream manufacturers.

Figure 31:
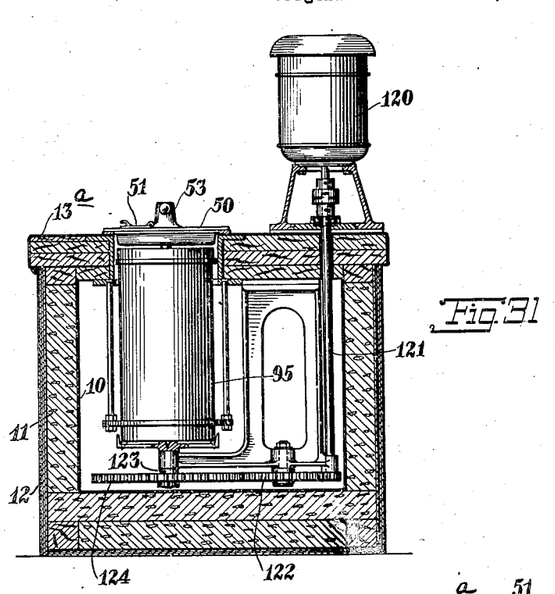
Figs. 31, 32 and 33 are sectional views of modifications of the apparatus involving different freezer can drives and motor mountings.
Figure 32:
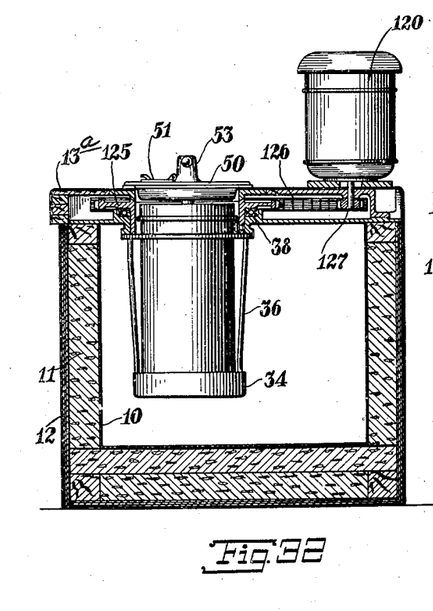
Figure 33:
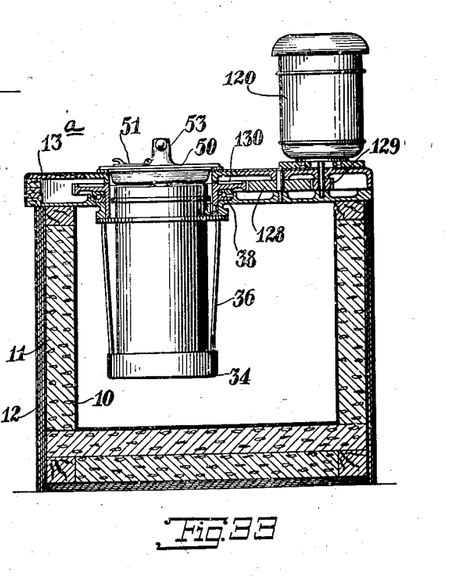

In Figs. 31 to 33 further modifications of the can drive are illustrated. In each case the motor 120 is supported by and above the cabinet top and thus to be fully disposed for inspection, adjustment or repairs. In Fig. 31 a table can supporting drive is provided by a vertical motor shaft 121 driving a bottom intermediate gear 122 which in turn drives a table driving shaft 123 through gear 124.

In Fig. 32 the upper can lip engaging wheel 125 is used, its drive being accomplished by a silent chain 126 which is driven directly by the motor shaft 127. In Fig. 33 the drive is similar, an intermediate gear 128 driven by the motor shaft 129 driving the rim gear 130 which engages and turns the can.

In considering the present invention, it will be seen that the various features and the modifications thereof are all interchangeable so that by judicious selection thereof apparatus of combination not specifically shown herein may be formed.

In accordance with the provisions of the patent statutes, I have described my invention, but I desire it understood that it is not confined to the particular form shown and described, the same being merely illustrative, and that the invention can be carried out in other ways without departing from the spirit of my invention, and therefore, I claim broadly the right to employ all equivalent instrumentalities coming within the scope of the appended claims, and by means of which, objects of my invention are attained and new results accomplished; as it is obvious that the particular embodiments herein shown and described are only some of many that can be employed to attain these objects and accomplish these results.

Having now described my invention, what I claim as new and desire to claim by Letters Patent, is:

1. A refrigeration apparatus including a brine tank of generally rectangular formation, heat insulating walls surrounding the tank, cooling means within the tank, a freezing can within the tank, and a motor mounted outside of said tank but within the plane of the insulating walls thereof for agitating the contents of the can.

2. A refrigeration apparatus including a brine tank, heat insulating walls surrounding the tank, cooling means within the tank, a freezing can within the tank, and means outside of the tank but within the plane of the insulating walls for rotating the can, said means including an electrical motor depending from the top plate of the tank.

3. A refrigeration apparatus including a brine tank, a freezing can within the brine tank, a cooling coil in the tank encircling the can and following the contour of the walls of the tank, and a heat insulating cabinet enclosing the tank, a wall of said cabinet being depressed to form a niche to receive an agitating motor.

4. A refrigeration apparatus including a brine tank, a freezing can within said brine tank, a motor, an agitating mechanism for said freezing can, a cooling coil in the tank, a heat insulating cabinet enclosing the tank, one of the walls of which is depressed to form a motor niche, a heat insulating top cover for said cabinet, said top cover extending over said niche, said top cover being recessed to receive a driving means extending from said motor to the agitating mechanism of said freezing can.

5. A refrigeration apparatus including a brine tank, a freezing can within said brine tank, mold receiving pockets in said brine tank, a cooling coil within said brine tank, said cooling coil having a portion of flattened M-shaped formations to provide recesses for the freezing can and mold pockets.

6. A refrigeration apparatus, including a brine tank, a freezing can within said brine tank, mold receiving pockets in said brine tank, a cooling coil within said brine tank, opposite portions of said coil adjacent said freezing can and said mold receiving pockets having inwardly directed bends.

7. A refrigeration apparatus including a brine tank, a freezing can within said tank, means to rotate said can, said means comprising an electric motor outside of the tank, a pulley on said motor, of relatively small dimension, a drive wheel of relatively large dimension surrounding the rim of the can, and a drive belt operatively connecting said pulley and said wheel.

8. The combination with a refrigerating apparatus, comprising a brine tank, a freezing can within said tank, heat insulating means to cover said tank and said can during the freezing operation and a dasher, mechanically operable inside said freezing can; of a stripper device, consisting of an auxiliary can cover, apertured to permit removal from the can through said cover of said dasher.

9. The combination with a refrigerating apparatus, comprising a brine tank, a freezing can within said tank, heat insulating means to cover said tank and said can during the freezing operation and a dasher, mechanically operable inside said freezing can; of a stripper device, consisting of an auxiliary can cover, apertured to permit removal from the can through said cover of said dasher, the apertures of the auxiliary can cover being in conformity with the cross section of the dasher to act to remove clinging operating material from the dasher.

LEVIN S. PARKER.